United States Patent [19]

Susnjara

[11] 3,943,022

[45] Mar. 9, 1976

[54] METHOD OF FORMING SHARP BENDS IN PLASTIC FACED FLAT PANELS

[75] Inventor: Kenneth J. Susnjara, Santa Claus, Ind.

[73] Assignee: Thermwood Corporation, Dale, Ind.

[22] Filed: July 22, 1974

[21] Appl. No.: 490,552

[52] U.S. Cl. .................. 156/211; 52/631; 156/227; 156/268; 156/257; 156/295; 428/121; 428/130
[51] Int. Cl.² .......................................... B31F 3/00
[58] Field of Search ........... 156/196, 214, 211, 268, 156/227, 272, 257, 295, 258, 304, 267, 299; 52/631, 259; 83/5, 7, 6; 160/135, 351, 231 A; 264/139; 161/36, 113, 37, 117, 38; 29/445, 476; 428/60, 130, 121; 144/314, 316, 315

[56] References Cited
UNITED STATES PATENTS

| | | | |
|---|---|---|---|
| 1,133,106 | 3/1915 | Cuppett | 52/631 |
| 2,157,794 | 5/1939 | MacDonald et al. | 156/211 |
| 2,751,321 | 6/1956 | Sans | 161/38 |
| 2,854,373 | 9/1958 | Beach | 156/299 |
| 3,101,602 | 8/1963 | Tosi | 156/211 |
| 3,539,425 | 11/1970 | Marburg | 156/304 |
| 3,647,590 | 3/1972 | Wolf | 156/211 |
| 3,654,053 | 4/1972 | Toedter | 161/113 |
| 3,791,002 | 2/1974 | Lampe et al. | 29/476 |

Primary Examiner—William A. Powell
Assistant Examiner—J. J. Gallagher
Attorney, Agent, or Firm—Barry L. Clark

[57] ABSTRACT

Improved forming method permits a flat laminate panel comprising a thin, deep vacuum formed thermoplastic face surface member bonded to a rigid backing member to be bent sharply so as to form the sides and front of a cabinet, for example, in one integral piece. The bends are accommodated by removing material from the back of the panel so as to form V-grooves whose included angles are equal to the angle of bends desired. The grooves extend through the entire thickness of the backing member and a portion of the plastic layer. A small bead of hot melt adhesive placed in the groove serves to soften the plastic so it can be bent without cracking. The panel sections adjacent the V-grooves are then brought into contact and immediately and permanently bonded together by the adhesive, thus eliminating the need for additional bracing while the adhesive sets.

6 Claims, 6 Drawing Figures

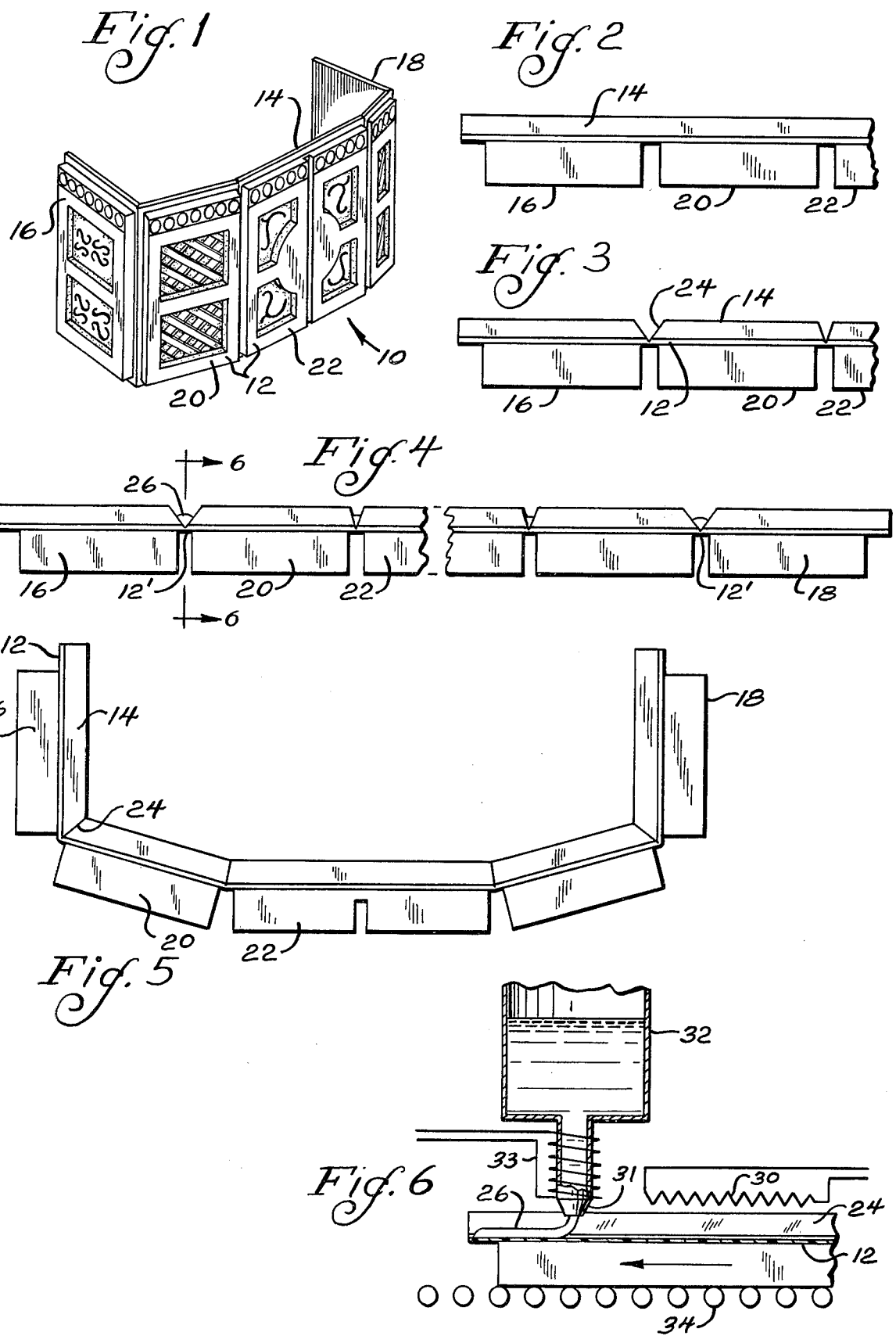

METHOD OF FORMING SHARP BENDS IN PLASTIC FACED FLAT PANELS

BACKGROUND OF THE INVENTION

This invention relates to the manufacture of furniture, and particularly to the manufacture of inexpensive but high quality cabinets, such as television and stereo consoles having three dimensional configurations on both their fronts and sides. In the past, such cabinets have usually been made of separate pieces of wood which are jointed and glued together. More recently, developments in plastic molding and finishing techniques have permitted the cabinet components to be made of plastic face laminates which are then glued or screwed to each other. Generally, the exteriors are formed of thin plastic shells which are deep drawn by vacuum thermoforming techniques so as to include very fine details such as wood graining which can be finished to give the appearance of fine wood. The joining operation is quite time consuming. Although it is well known in the furniture art that materials such as plywood, for example, can be gently bent by cutting a series of closely spaced slots in the back surface, placing glue in the slots, and then holding the face surface against a template while the glue sets, this operation is also time consuming.

SUMMARY OF THE INVENTION

It is an object of this invention to provide a very fast and economical method of forming and joining the fronts and sides of cabinets or the like.

It is another object of the invention to provide a method of forming a sharp bend in a plastic faced flat laminated panel without cracking or otherwise damaging the plastic.

These and other objects are achieved by the present invention wherein V-grooves are formed in the rear surface of a rigid panel faced with a plastic shell along the lines where bending is to take place. The grooves pass through the entire thickness of the backing material and through about one-half or more of the thickness of the plastic. A small bead of a suitable hot melt adhesive, such as one sold by Minnesota Mining & Manufacturing Company, is then placed along the length of the grooves in contact with the plastic. After the plastic, which is preferably high impact polystyrene, has softened from the heat of the hot adhesive, the panel portions adjacent each side of each groove are moved toward each other until the sides of the V-grooves contact each other. As the sides of the grooves move into contact, the bead of hot adhesive spreads between them and is rapidly cooled, resulting in an instantaneous bond which eliminates any necessity of bracing the formed panel before attaching it to other components such as the top and bottom. Since the application of the adhesive, the softening of the plastic, and the bending and setting up of the joint can all be accomplished within about 30 seconds or less, it is obvious that the process is highly adaptable to assembly line production techniques. Although hot melt adhesives are known which have melting points as high as 700°F. and which would provide sufficient heat to permit a 90° bend in plastic of a thickness of 0.080 inches, it is also possible to use adhesives having a much lower melting point, such as 450°F. or even lower. However, where only a small bead of a hot melt adhesive having a relatively low melting point is used, it is usually necessary to provide auxiliary heating of the walls of the V-groove to prevent the backing board from acting as a heat sink which would draw the heat from the adhesive which is needed to soften the plastic and prevent its cracking as it is bent. This can be easily accomplished in a production set up by traversing the V-grooves under a rod type heater element just before the adhesive bead is applied. The temperature of the adhesive used and the amount, if any, of auxiliary heating applied can be varied to achieve the best joint in the least amount of time. A high temperature adhesive would be cooled by the V-groove surfaces more slowly than a lower temperature adhesive and thus might not set as quickly as desired while a lower temperature adhesive might lose too much heat to the backing board before the plastic was heated to its softening temperature of approximately 185°F.

BRIEF DESCRIPTION OF THE DRAWINGS

FIG. 1 is a perspective view of a one piece plastic faced cabinet front and side unit formed in accordance with the invention;

FIG. 2 is a top edge view of a portion of a laminated panel before it is grooved;

FIG. 3 is a view similar to FIG. 2 but showing the panel after grooving;

FIG. 4 is a view similar to FIG. 3 but showing the panel after hot melt adhesive is placed in the grooves;

FIG. 5 is a view similar to FIG. 4 but showing the panel folded where it is grooved; and, FIG. 6 is a view of a panel taken on line 6—6 of FIG. 4 showing the relationship of the panel to a source of hot adhesive and an auxiliary heater.

DETAILED DESCRIPTION

Referring to FIG. 1, a cabinet subassembly indicated generally at 10 can be seen as comprising a deep vacuum formed plastic face panel 12 laminated to a rigid backing member 14 such as particle board, by means of construction adhesive (not shown). The cabinet side panels 16,18 are originally in the same plane as the cabinet center panels 20,22 (FIG. 2) but the plastic face panel 12 and backing member 14 are then grooved as shown at 24 through the entire thickness of the backing member 14 and a portion of the thickness of the plastic face panel 12 (FIG. 3). The amount of material removed to form the grooves 24 should exactly correspond to the angle of bend desired. For example, 75° and 15° grooves are formed to produce the shape shown in FIG. 1. A bead 26 of hot melt adhesive is then placed in each of the grooves 24. After the heat of the hot melt adhesive 26 has softened the plastic 12 along the lines 12' located at the bottom of the grooves 24, the side panel portions 16,18 are readily manually pivoted relative to the center panel portions 20,22 to form the subassembly 10 shown in FIGS. 1 and 5. Since the relatively small mass of hot adhesive 26 is rapidly cooled as it is squeezed along the relative cool walls of the V-grooves 24, it has been found that the side and front panels maintain the relationship shown in FIG. 5 from the instant they are brought into contact, thus obviating the need to clamp or brace them until the adhesive has set.

The angular extent to which the plastic surface 12 can be bent without cracking by the use of the hereinbefore described process is dependent on the type and thickness of plastic 12, the depth of the grooves 24, and the amount of heat applied to the plastic along the line of bending 12'. Where the temperature and thickness of the hot melt adhesive 26 is insufficient to soften the plastic sufficiently (approximately 185° F.) to permit a sharp bend before the heat of the adhesive is lost to the walls of the V-grooves 24, an auxiliary heat source such as a rod type electric heating elements indicated schematically at 30 in FIG. 6 can be utilized. The heat is applied to the top of the V-grooves 24 for a few seconds before the adhesive 26 is applied from the nozzle 31 of heated dispenser 32 to warm the walls of the V-grooves 24. The application of heat and adhesive is readily accomplished by moving the cabinet subassembly 10 on a conveyor table 34 in the direction shown by the arrow in FIG. 6.

The improved forming method is especially valuable for use in the assembly line manufacture of cabinetry since the steps of the method can all take place very quickly. For example, where a plastic shell member 12 of 0.080 inches thick high impact polysytrene is affixed to a backing member 14 of 0.500 inches particle board, it is possible to cut the grooves 24 to a depth of about 0.56 inches in less than 10 seconds by means of a double end tenoner equipped with V-groove cutters. Where a hot melt adhesive bead 26 having a relatively low melting point of 450° F. and a height of 0.25 inches is used in a 75° groove and where supplemental heat is added as shown in FIG. 6, it is possible to go from the stage shown in FIG. 3 to the stage shown in FIG. 5 in less than 30 seconds. In such a procedure, the heater rods 30 would be in an oven (not shown) into which the composite 10 would be moved on conveyor 34 in a direction parallel to the heater rods. As the composite 10 is withdrawn from the oven, adhesive dispensers 32 heated by resistance heaters 33 dispense beads 26 of hot glue in the grooves 24. The side panels 16,18 and front panels 20,22 are then immediately moved toward each other so as to close up the grooves 24 and form the completed joint with the front panel 20. This operation can be done either manually or by automatic equipment. At any rate, the unit shown in FIG. 5 does not require additional clamping and is ready to advance to succeeding manufacturing stations (not shown) where the top and bottom portions are attached to it and paint and other finishes are applied. Although adhesive is shown in all the grooves 24 in FIG. 4, it is generally not necessary in the narrow angle grooves connecting the panels 20 and 22 since the top and bottom of composite 10 is ordinarily fitted into a complementary groove in a base member and a top member (not shown).

I claim as my invention:

1. A method of forming a sharp bend in a laminated composite article consisting of a thin thermoplastic shell member bonded to a thick backing member comprising the steps of removing a V-shaped section of material from the backing member and from the rearmost portion of the thermoplastic shell member in the region where the bend is to be formed, applying a bead of hot melt adhesive in the bottom of the V-groove resulting from the removal of material, allowing the hot adhesive to soften the shell member to a point where it can be bent without cracking, and bending the composite to bring the sides of the V-groove toward and into contact with each other, thereby forcing the glue along the sides of the V-groove.

2. The method of claim 1 wherein said hot melt adhesive is sufficiently hot to heat thermoplastic shell along a line of bending to a temperature of at least about 185° F.

3. The method of claim 1 wherein an external source of heat is applied to the walls of the V-groove before said bead of adhesive is applied.

4. The method of claim 3 wherein said composite article is moved on a conveyor so that said V-groove moves directly and continuously from a position under said external source of heat to a position under a source of said hot melt adhesive, said bead of adhesive being applied to said V-groove as said composite is moved by said conveyor.

5. The method of claim 1 wherein the plastic at the bottom of the V-groove is of a thickness of about one-half or less of the plastic thickness immediately adjacent the V-groove.

6. The method of claim 1 wherein said adhesive is applied at a temperature of at least about 450° F.

* * * * *